(12) United States Patent
Rustvold et al.

(10) Patent No.: US 10,305,360 B2
(45) Date of Patent: May 28, 2019

(54) MAGNET TO MAGNET COUPLINGS AND DRIVES

(71) Applicant: MagnaDrive Corporation, Woodinville, WA (US)

(72) Inventors: Rian Rustvold, Kenmore, WA (US); Jeongkwan Lee, Bellevue, WA (US); Geoffrey Reynolds Harmon, Sammamish, WA (US)

(73) Assignee: MagnaDrive Corporation, Woodinville, WA (US)

( * ) Notice: Subject to any disclaimer, the term of this patent is extended or adjusted under 35 U.S.C. 154(b) by 141 days.

(21) Appl. No.: 15/349,810

(22) Filed: Nov. 11, 2016

(65) Prior Publication Data

US 2017/0141672 A1    May 18, 2017

Related U.S. Application Data

(60) Provisional application No. 62/254,859, filed on Nov. 13, 2015.

(51) Int. Cl.
| | | |
|---|---|---|
| *H02K 49/10* | (2006.01) | |
| *H02K 49/08* | (2006.01) | |
| *H02K 17/16* | (2006.01) | |
| *H02K 16/04* | (2006.01) | |
| *H02K 1/18* | (2006.01) | |
| *H02K 21/26* | (2006.01) | |
| *H02K 16/02* | (2006.01) | |
| *H02K 1/27* | (2006.01) | |
| *H02K 21/24* | (2006.01) | |
| *H02K 19/10* | (2006.01) | |

(Continued)

(52) U.S. Cl.
CPC .............. *H02K 49/108* (2013.01); *H02K 1/02* (2013.01); *H02K 1/06* (2013.01); *H02K 1/182* (2013.01); *H02K 1/2793* (2013.01); *H02K 16/02* (2013.01); *H02K 16/04* (2013.01); *H02K 17/16* (2013.01); *H02K 19/103* (2013.01); *H02K 21/24* (2013.01); *H02K 21/26* (2013.01); *H02K 49/08* (2013.01); *H02K 2201/03* (2013.01)

(58) Field of Classification Search
CPC .. H02K 1/02; H02K 1/06; H02K 1/14; H02K 1/182; H02K 1/2793; H02K 16/02; H02K 16/04; H02K 17/16; H02K 19/103; H02K 21/16; H02K 21/24; H02K 2201/03; H02K 25/1732; H02K 49/08
USPC ....... 310/12.24, 114, 126, 156, 216, 568, 90
See application file for complete search history.

(56) References Cited

U.S. PATENT DOCUMENTS 5,834,872 A * 11/1998 Lamb .................. H02K 49/046
310/103
6,046,518 A * 4/2000 Williams ............. B60K 7/0007
310/114

(Continued)

*Primary Examiner* — Bernard Rojas
*Assistant Examiner* — Rashad H Johnson
(74) *Attorney, Agent, or Firm* — Seed Intellectual Property Law Group LLP

(57) ABSTRACT

A balanced magnetic rotor assembly is disclosed. The balanced rotor assembly including a driver rotor assembly having a first driver rotor assembly and a second driver rotor assembly arranged about a rotational axis and being spaced apart from each other a distance along the rotational axis, and a load rotor being arranged about the rotational axis and arranged between the first driver rotor and the second driver rotor.

2 Claims, 11 Drawing Sheets

(51) Int. Cl.
 *H02K 1/06* (2006.01)
 *H02K 1/02* (2006.01)

(56) References Cited

U.S. PATENT DOCUMENTS

| | | | |
|---|---|---|---|
| 6,577,037 B2 * | 6/2003 | Killen | H02K 49/046 |
| | | | 310/103 |
| 2013/0187488 A1 * | 7/2013 | Sakamoto | H02K 1/06 |
| | | | 310/44 |
| 2013/0320681 A1 * | 12/2013 | Karmaker | H02K 49/102 |
| | | | 290/55 |
| 2015/0244220 A1 * | 8/2015 | Yost | H02K 1/2793 |
| | | | 310/156.12 |

* cited by examiner

MAGNET TO MAGNET COUPLINGS AND DRIVES

BACKGROUND

Technical Field

The present disclosure relates to apparatuses, systems, and methods for magnetic couplings and drives and, more particularly, to magnetically balanced magnetic couplings and drives.

Description of the Related Art

Magnetic drive systems operate by transmitting torque from a motor to a load across an air gap. There is no mechanical connection between the driving and driven sides of the equipment. Torque is created by the interaction of powerful magnets on one side of the drive with induced magnetic fields on the other side.

Magnetic drive systems may include a magnetic rotor assembly at the driven end and a conductor rotor assembly at the driver end. The conductor rotor assembly includes a rotor made of a conductive material, such as aluminum, copper, or brass. In some magnetic drive systems, such as the adjustable speed drive systems, the magnetic drive system also includes actuation components, which control the air gap spacing between the magnet rotors and the conductor rotors.

Magnetic drive systems may also include a magnetic rotor assembly at the driven end and a magnetic rotor assembly at the driver end. In magnetic drive systems that include a magnetic rotor assembly at the driven end and a magnetic rotor assembly at the driver end, large axial forces are generated between the two magnetic rotor assemblies. The large axial forces are caused by the magnetic attraction or repulsion forces between the two magnetic rotor assemblies. To support these large magnetic loads, large axial bearings and a sturdy axial support structure are used.

BRIEF SUMMARY

A balanced magnetic rotor assembly is disclosed. The balanced magnetic rotor assembly may include a driver rotor assembly having a first driver rotor and a second driver rotor arranged about a rotational axis and being spaced apart from each other a distance along the rotational axis. The first driver rotor may include a first array of a first plurality of magnets coupled to a first plate, the first array of the first plurality of magnets arranged in a first plane that is perpendicular to the rotational axis of the driver rotor assembly, a first of the first plurality of magnets having a north pole face in a first direction and being arranged between a second and a third of the first plurality of magnets, the second and the third of the first plurality of magnets having a south pole face also in the first direction. The second driver rotor may include a second array of a second plurality of magnets coupled to a second plate, the second array of the second plurality of magnets arranged in a second plane that is perpendicular to the rotational axis of the driver rotor assembly and parallel to the first plane, a first of the second plurality of magnets having a south pole face in a second direction and being arranged between a second and a third of the second plurality of magnets, the second and the third of the second plurality of magnets having a north pole face also in the second direction. The balanced magnetic rotor assembly may also include a load rotor being arranged about the rotational axis and arranged between the first driver rotor and the second driver rotor, the load rotor including a body having a third array of a third plurality of magnets therein, the third array of the third plurality of magnets arranged in a third plane that is perpendicular to the rotational axis of the driver rotor assembly and parallel to the first and second planes, a first of the third plurality of magnets having a north pole face in the first direction and a south pole face in the second direction and being arranged between a second and a third of the third plurality of magnets, the second and the third of the third plurality of magnets each having a south pole face in the first direction and a north pole face in the second direction.

Another balanced magnetic rotor assembly is disclosed and may include a driver rotor having a first body and a first array of a first plurality of magnets and a first ring magnet therein, the first array of the first plurality of magnets arranged in a first plane that is perpendicular to a rotational axis of the driver rotor, a first of the first plurality of magnets having a north pole face in a first direction and being arranged between a second and a third of the first plurality of magnets, the second and the third of the first plurality of magnets having a south pole face also in the first direction, the first ring magnet having a ring shape, the ring shape having a center that is on the rotational axis, the first ring magnet having a first magnetic having pole a first magnetic polarity in the first direction. The balanced magnetic rotor assembly may also include a load rotor assembly having a second body and a second array of a second plurality of magnets and a second ring magnet therein, the second array of the second plurality of magnets arranged in a second plane that is perpendicular to the rotational axis of the driver rotor, a first of the second plurality of magnets having a south pole face in a second direction, opposite the first direction and being arranged between a second and a third of the second plurality of magnets, the second and the third of the second plurality of magnets having a north pole face also in the second direction, the second ring magnet having a ring shape, the ring shape having a center that is on the rotational axis; the second ring magnet having a first magnetic pole having a the first magnetic polarity in the second direction.

DETAILED DESCRIPTION

The following detailed description is directed toward apparatuses, systems, and methods for use in connection with magnetic drive systems. The description and corresponding figures are intended to provide an individual of ordinary skill in the art with enough information to enable that individual to make and use embodiments of the invention. Such an individual, however, having read this entire detailed description and reviewed the figures, will appreciate that modifications can be made to the illustrated and described embodiments, and/or elements removed therefrom, without deviating from the spirit of the invention. It is intended that all such modifications and deviations fall within the scope of the invention, to the extent they are within the scope of the associated claims.

Figure 1A:
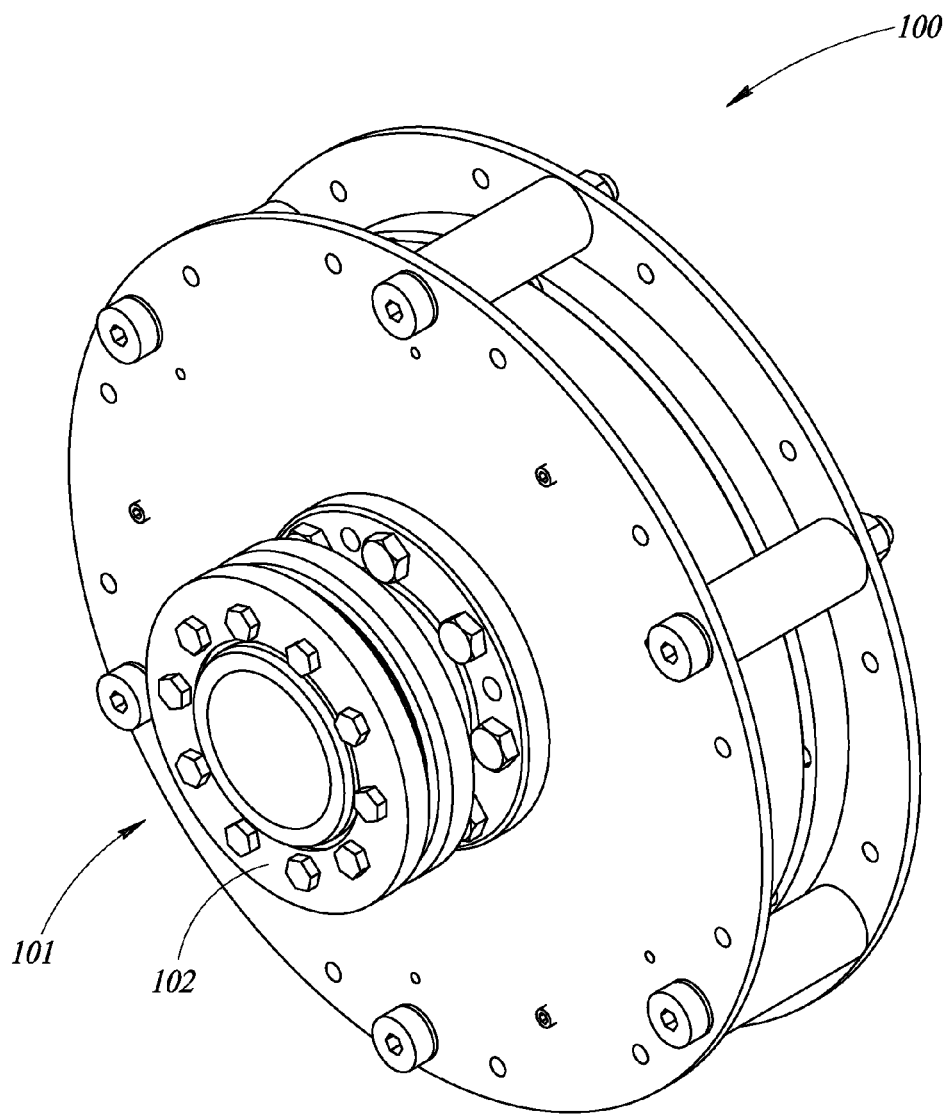
FIG. 1A is an isometric view of a three-rotor balanced magnetic rotor assembly illustrating a driver end, according to one or more embodiments disclosed herein.
Figure 1B:
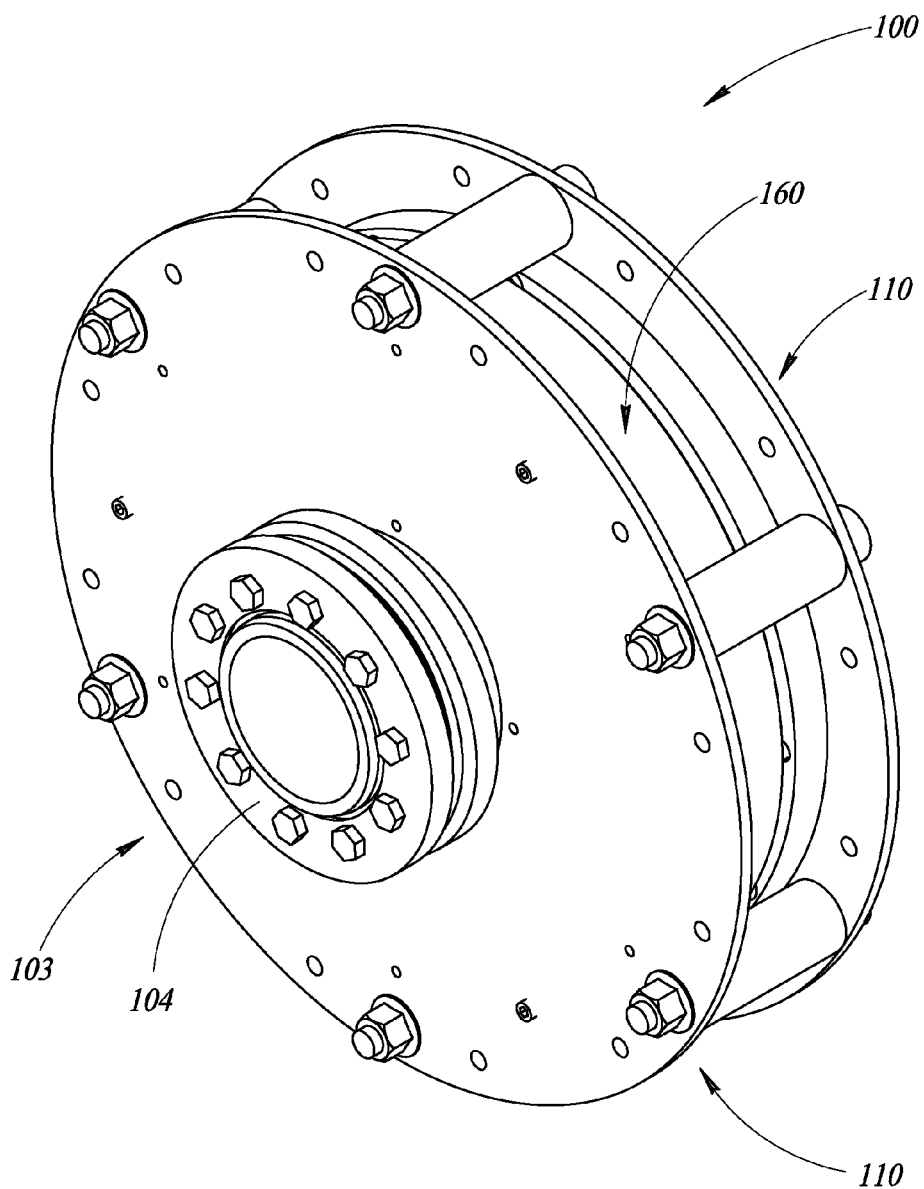
FIG. 1B is an isometric view of a three-rotor balanced magnetic rotor assembly illustrating a load end, according to one or more embodiments disclosed herein.
Figure 2A:
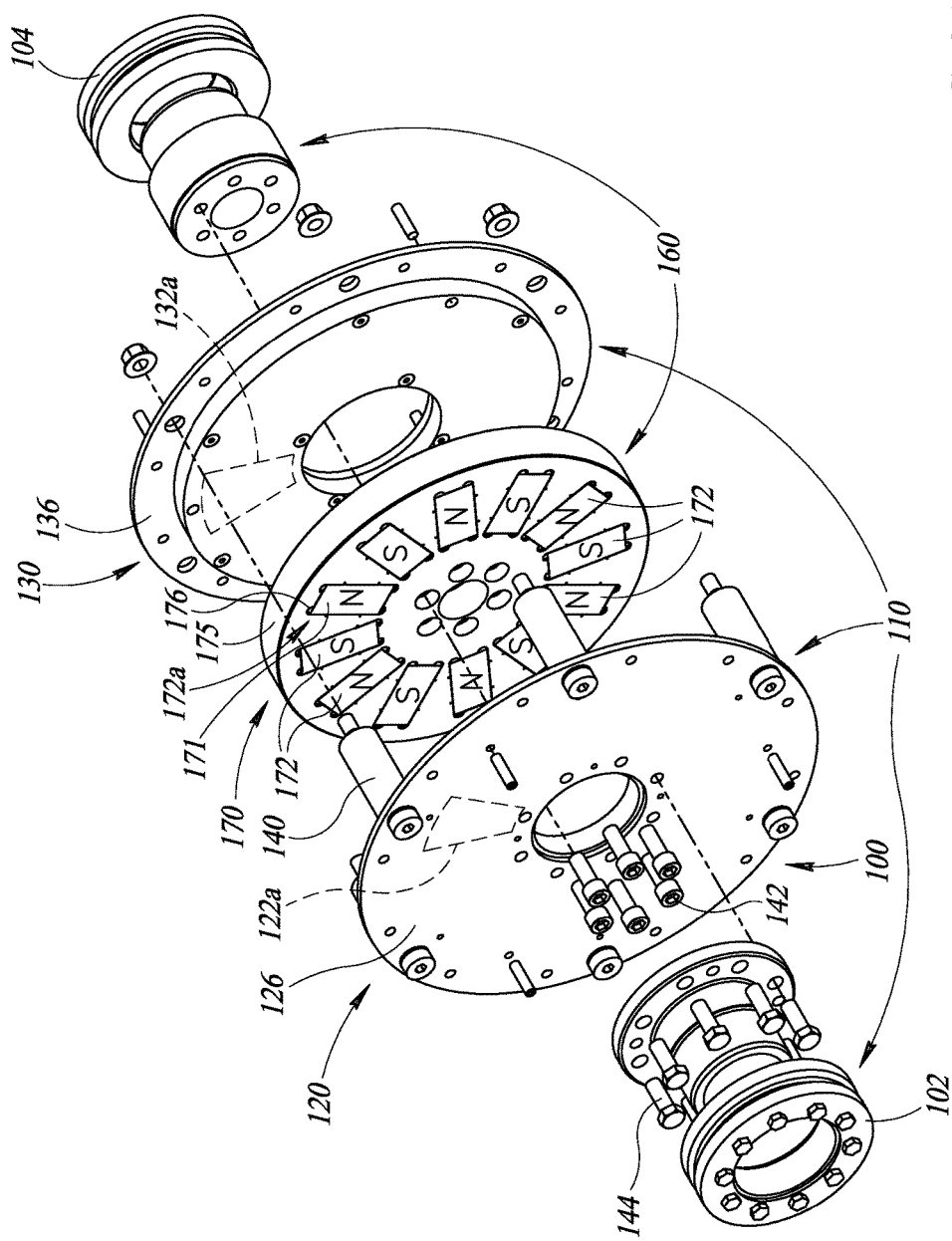
FIG. 2A includes an exploded view of a three-rotor balanced magnetic rotor assembly, according to one or more embodiments disclosed herein.
Figure 2C:
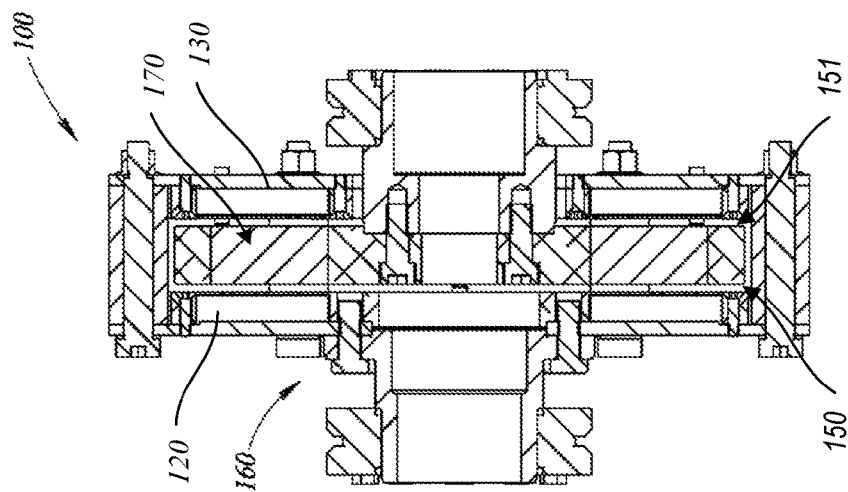
FIG. 2C is a cross-sectional view of a three-rotor balanced magnetic rotor assembly, according to one or more embodiments disclosed herein.
Figure 2B:
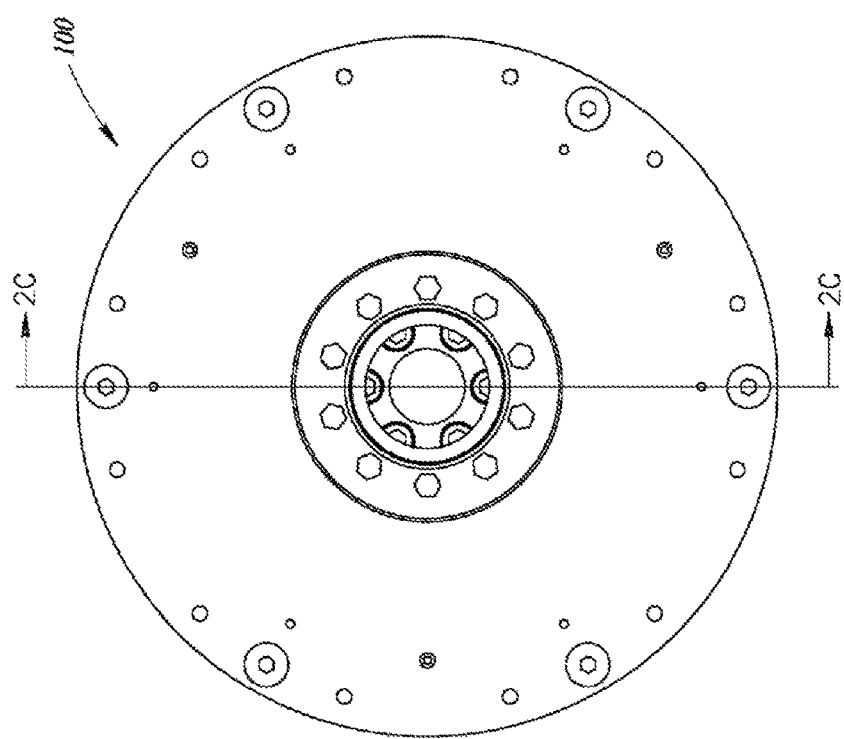
FIG. 2B is a side view of a three-rotor balanced magnetic rotor assembly, according to one or more embodiments disclosed herein.

Referring now to FIGS. 1-3, a three-rotor balanced magnetic rotor assembly 100 is described. FIGS. 1-3 depicts the three-rotor balanced magnetic rotor assembly 100 and various views. FIG. 1 (collectively including FIGS. 1A and 1B) shows the rotor assembly 100 in an assembled configuration. FIG. 1A shows the driver end 101 of the rotor assembly 100 and FIG. 1B shows the load end 103 of the rotor assembly 100. The driver end 101 of the rotor assembly 100 may be the power input side of the rotor assembly 100, while the load end 103 of the rotor assembly 100 may be the output side of the rotor assembly 100. In some embodiments, a motor, such as an electric or gas powered motor, may be attached to the driver coupling 102 of the rotor assembly 100, and a load, such as a fan or blower, a conveyor system, or other load, may be attached to the load coupling 104 of the rotor assembly 100. As described below, the rotor assembly 100 includes three rotors split between a load assembly 160 and a driver assembly 110. The load assembly 160 includes the load coupling 104, that includes a hub and shrink disk, and the load rotor 170, and the driver assembly 110 includes the driver coupling 102 and two driver rotors 120, 130. As best shown in FIGS. 1 and 2 (collectively including FIGS. 2A-2C), the load rotor 170 is located between the two drive rotors 120, 130.

The transfer of rotational energy from the driver rotor assembly 110 to the load rotor assembly 160 occurs through the interaction of magnetic fields. In particular, the rotational energy is transmitted through the magnetic attractive forces between the magnets 172 in the load rotor 170 and the magnets 122, 132 in the driver rotors 120, 130. Moreover, as illustrated in FIG. 2C, the load rotor 170 is spaced apart from the driver rotor 120 by a first air gap 150 and the load rotor 170 is spaced apart from the driver rotor 130 by a second air gap 151. Further, as describe above, the first and second air gaps, 150, 151 do not provide a mechanical connection between the driving and driven sides, e.g., no physical connections are provided between the load rotor 170 and the driver rotors 120, 130. As the driver rotors 120, 130 rotate, the magnetic attractive forces between the magnets 122, 132 in the driver rotors 120, 130, pull the magnets 172 of the load rotor 170, causing the load rotor 170 to also rotate. The magnetic forces between the rotors 120, 130, 170 are in both an axial direction, in which each of the driver rotors pulls the load rotor axially; and radially, in which, as the driver rotors 120, 130 rotate, the magnets 122, 132 of the driver rotors 120, 130 also induce a circumferential, rotational, load on the magnets 172 of the load rotor 170. The radial forces between the rotors 120, 130, 170 transfer the rotational energy from the driver rotors 120, 130 to the load rotor 170. The axial loads generally do not contribute to the transfer of rotational energy between the rotors 120, 130, 170.

The axial loads in the three-rotor balanced magnetic rotor assembly 100 are balanced, such that the overall axial loads may be reduced. For example, as compared to an unbalanced magnetic rotor assembly, a balanced magnetic rotor assembly may use smaller axial thrust bearings and a smaller axial support structure.

In the embodiment shown in FIGS. 1-3, magnetic axial forces imparted on the load rotor 170 by the driver rotors 120, 130 may be balanced through an arrangement of the magnets 122, 132, 172 of the rotors 120, 130, 170. In particular, the polarity of the magnets 122, 132, 172 within the rotors 120, 130, 170 are arranged such that the axial magnetic forces between the rotor 120 and the rotor 170 are balanced with the axial magnetic forces between the rotor 170 and the rotor 130. By balancing the forces between the rotors 120, 130, 170, the axial bearings and the axial support structure that supports and aligns the rotor assembly 100 may be reduced or smaller as compared to an unbalanced rotor assembly.

In some embodiments, each of the magnets 122, 132, 172 may be a set of magnets having their magnetic poles facing the same direction, each adjacent set of magnets having opposite facing magnetic poles.

Figure 7:
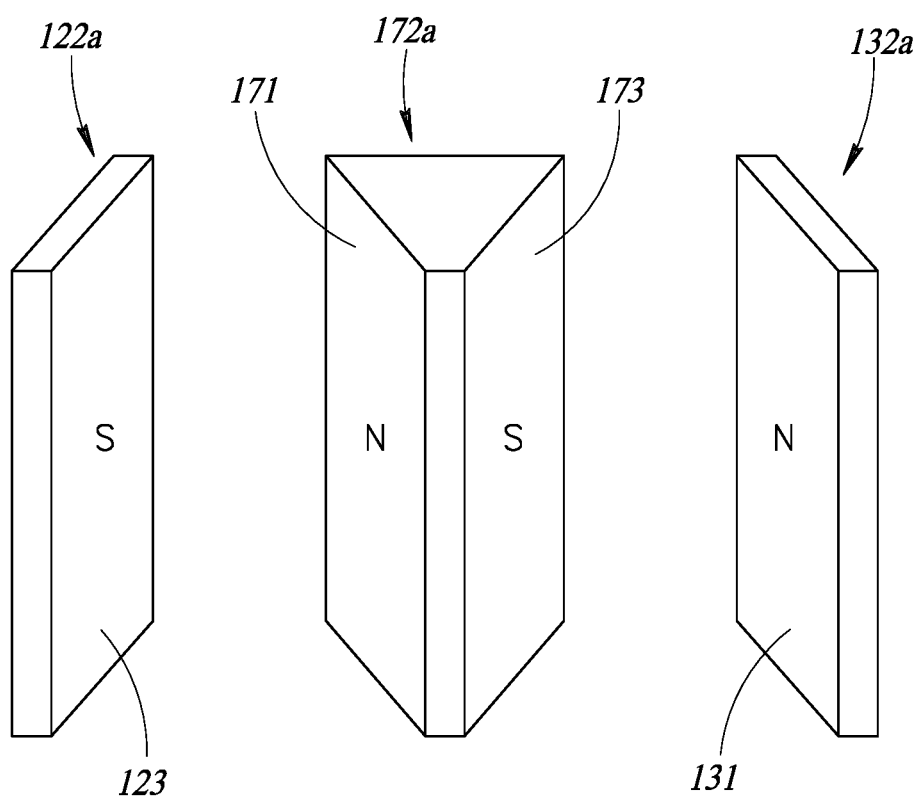
FIG. 7 shows a perspective view of an arrangement of magnets in a three-rotor balanced magnet drive system.

FIG. 7 shows an embodiment of an arrangement of magnets 122a, 132a, 172a in, for example, the three-rotor balanced magnetic rotor assembly 100. In such an embodiment, the magnet 122a, which may be located in the driver rotor 120, has its magnetic south pole face 123 facing a magnetic north pole face 171 of the magnet 172a, which would be located in the load rotor 170. The magnet 172a has its south pole surface 173 facing a north pole surface 131 of the magnet 132a of the driver rotor 130. The south pole surface 133 of magnet 132a is opposite the north pole surface 131. This arrangement creates an attractive force between the magnet 122a and the magnet 172a that is balanced by the attractive force between the magnet 172a and the magnet 132a.

As shown, for example, in FIG. 3 (collectively including FIGS. 3A-3D), the polarity of the magnets facing a side of a given rotor can alternate between a north pole facing surface and a south pole facing surface. In such an arrangement, as the driver rotors 120, 130 rotate relative to the load rotor 170, for example, during acceleration of the rotors, the forces between the driver rotors 120, 130 and the load rotor 170 alternate between a balanced attractive force and a balanced repulsive force. When the speed of the load rotor 170 matches the speed of the driver rotors 120, 130, the magnets may align an arrangement that balances attractive forces between the driver rotors 120, 130 and the load rotor 170.

FIG. 2A shows an exploded view of the three-rotor balanced magnetic rotor assembly 100. To assemble the magnetic rotor assembly 100, the load rotor 170 is placed between the two driver rotors 120, 130, and the two driver rotors 120, 130 are secured to each other via a plurality of spacer assemblies 140, which may be fasteners. The spacer assemblies 140 may include a bolt 151, a spacer 152 and a nut 153, as shown in FIG. 3. The bolt 151, the spacer 152, and the nut 153 aid in maintaining a separation distance between the driver rotors 120, 130.

As shown in FIG. 2, for example, the driver coupling 102 is coupled to a back plate of one of the driver rotors 120, 130. The driver coupling 120 may be secured to the back plate 126 of the driver rotor 120 with fasteners 144. Similarly, the load coupling 104 is coupled to the load rotor 170 via fasteners 142. In some embodiments, the driver coupling 102 and the load coupling 104 are shrink disk couplings, although other types of couplings may be used.

The load rotor 170 includes a body 175, which may be, for example, a frame. In some embodiments, the body 175 may include a plurality of cavities 176 configured to hold an array of magnets 172. As shown in FIG. 2, the magnets may be in a circular array that is arranged around the rotational axis of the load rotor 170. Although shown as rectangles in FIG. 2, the magnets 172, and indeed, also the magnets 122, 132 of the driver rotors 120, 130, may be rectangular in shape, pie shaped, wedge shaped, or other shape that facilitates the balancing of the axial magnetic forces between the load rotor 170 and the driver rotors 120, 130 and the transfer of energy between the load rotor 170 and the driver rotors 120, 130.

Figure 3A:
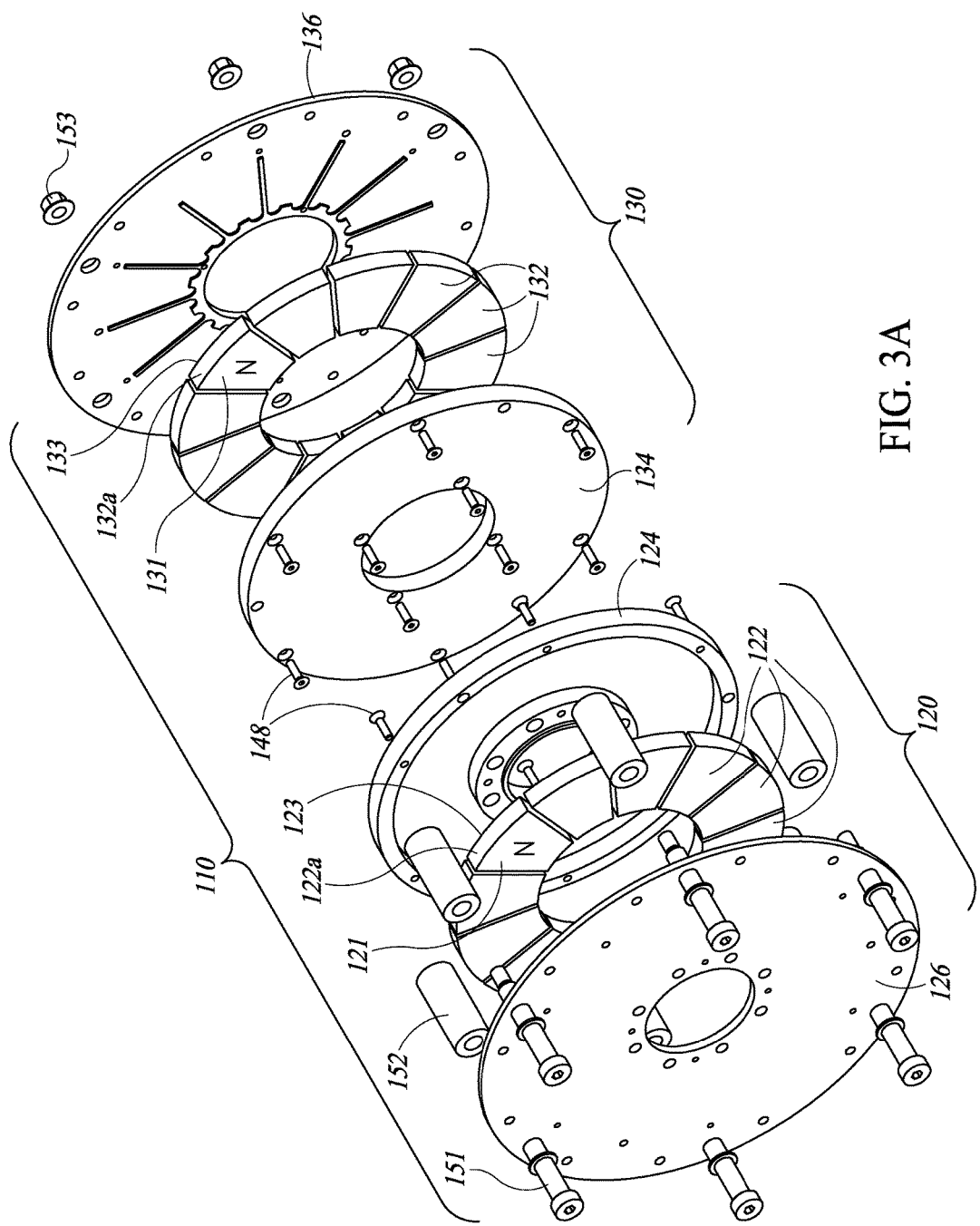
FIG. 3A is an exploded view of a drive side magnetic rotor of a three-rotor balanced magnetic rotor assembly, according to one or more embodiments disclosed herein.
Figure 3B:
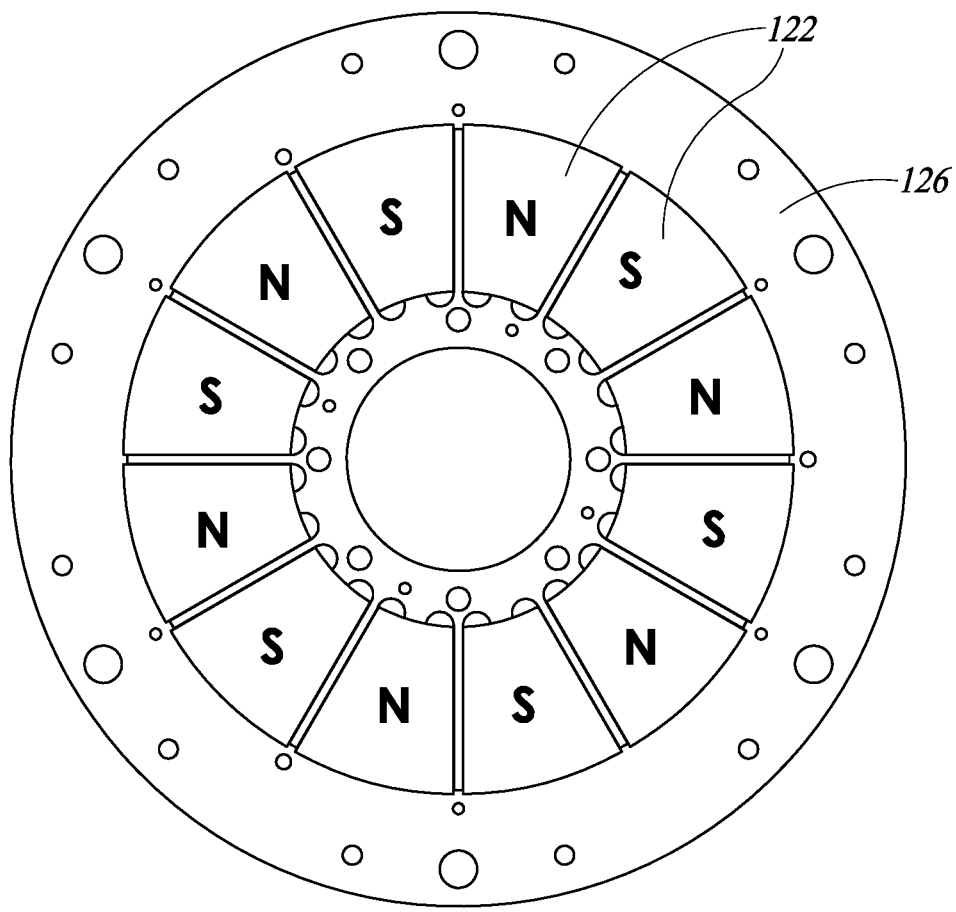
FIG. 3B is a front side view of a drive side magnetic rotor of a three-rotor balanced magnetic rotor assembly, according to one or more embodiments disclosed herein.
Figure 3D:
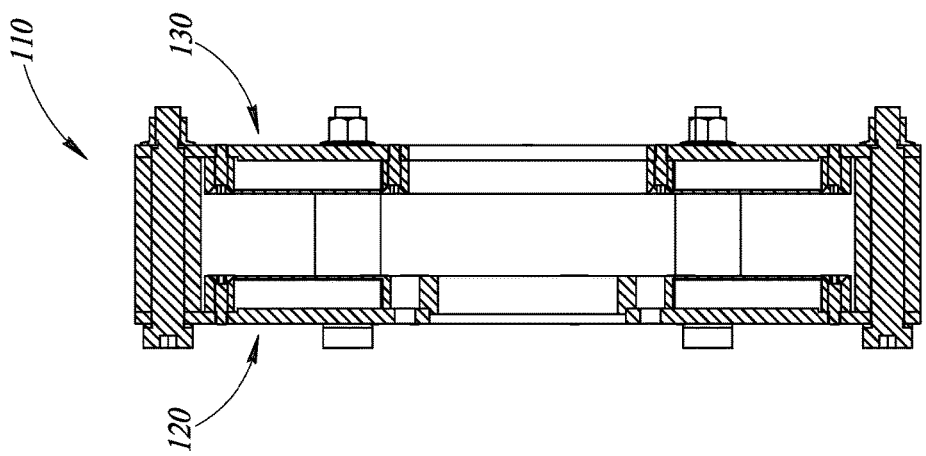
FIG. 3D is a cross-sectional view of a drive side magnetic rotor of a three-rotor balanced magnetic rotor assembly, according to one or more embodiments disclosed herein.
Figure 3C:
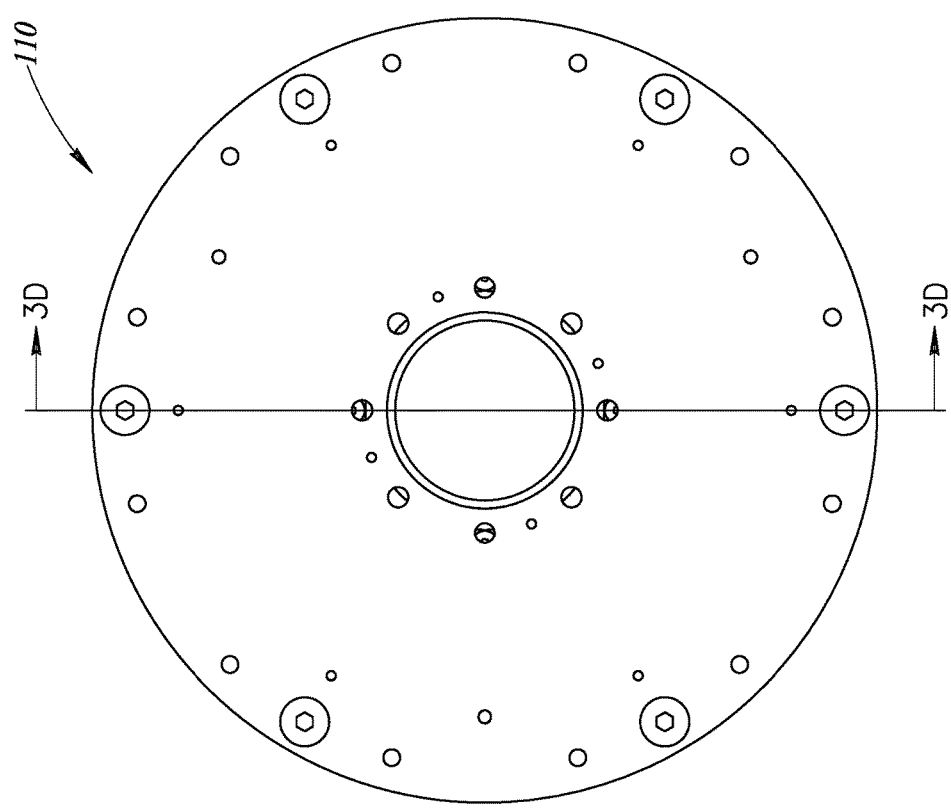
FIG. 3C is a back side view of a drive side magnetic rotor of a three-rotor balanced magnetic rotor assembly, according to one or more embodiments disclosed herein.

FIG. 3A shows an exploded view of the driver rotor assembly 110. As discussed above, the driver rotor assembly 110 includes two driver rotors 120, 130. Each driver rotor 120, 130 may include an array of magnets 122, 132 mounted to a frame 126, 136. The magnets 122, 132, shown in FIG. 3, are arranged in an array that forms the shape of an annulus, but in other embodiments the magnets may be formed in other shapes.

The magnets 122, 132 may be affixed to one of the back plates 126, 136 via epoxy, glue, an adhesive, or other material. In addition, the array of magnets 122, 132 may be held against one of the back plates via a cover, such as one of the covers 124, 134. The covers 124, 134 may be coupled or otherwise secured to one of the back plates 126, 136 via one or more fasteners 148.

Figure 4:
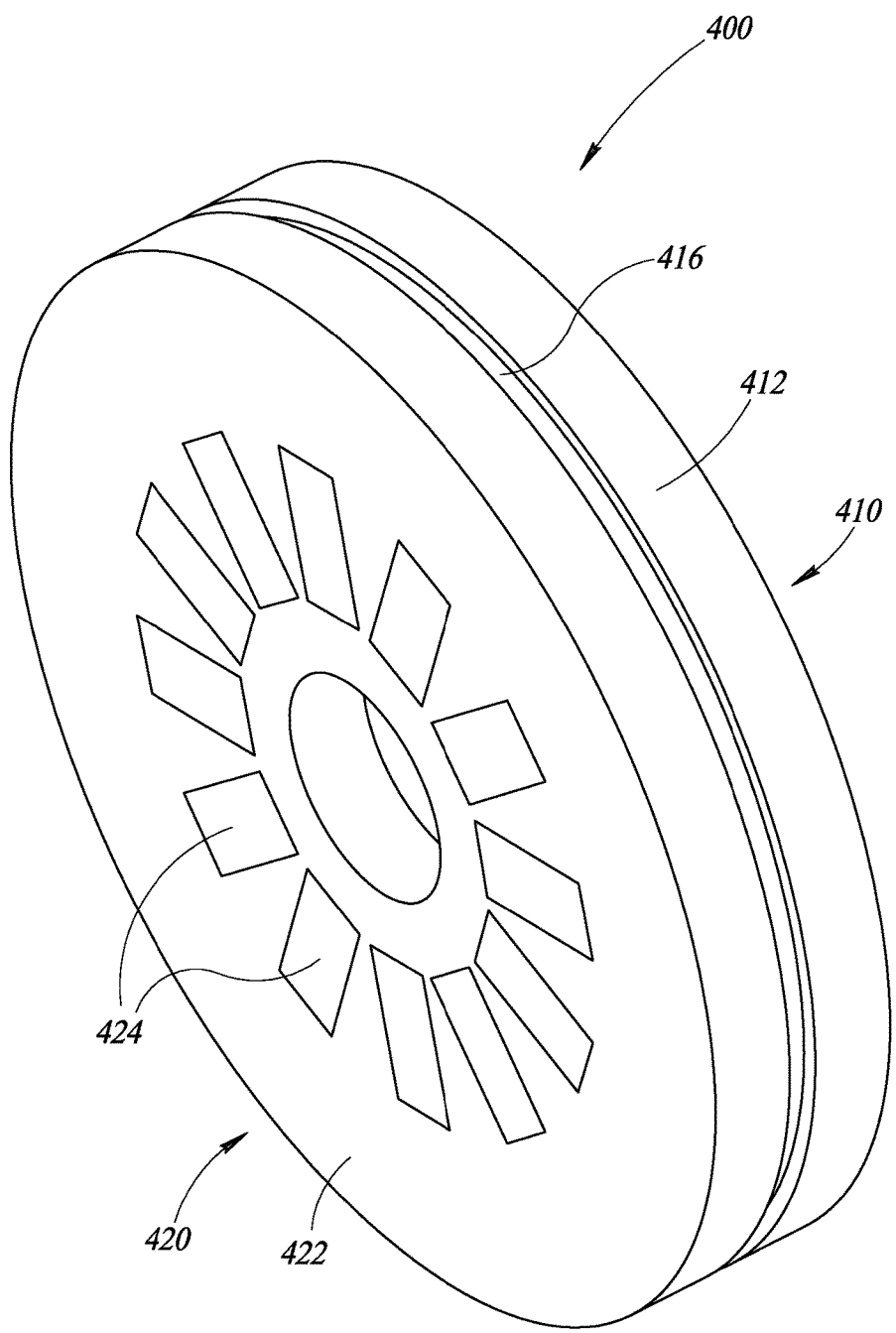
FIG. 4 is an isometric view of a two-rotor balanced magnetic rotor assembly, according to one or more embodiments disclosed herein.
Figure 5:
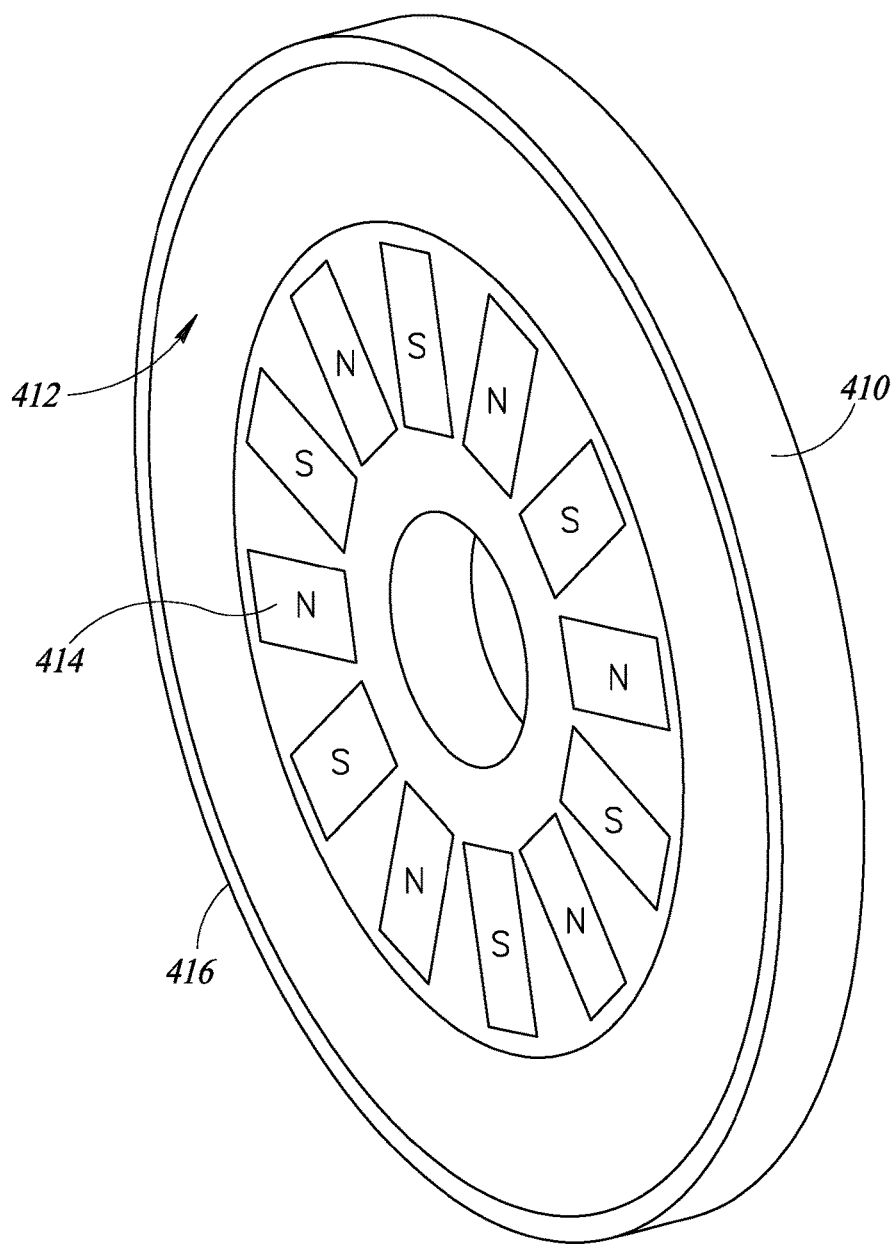
FIG. 5 is an isometric view of one magnetic rotor of the two-rotor balanced magnetic rotor shown in FIG. 4, according to one or more embodiments disclosed herein.
Figure 6:
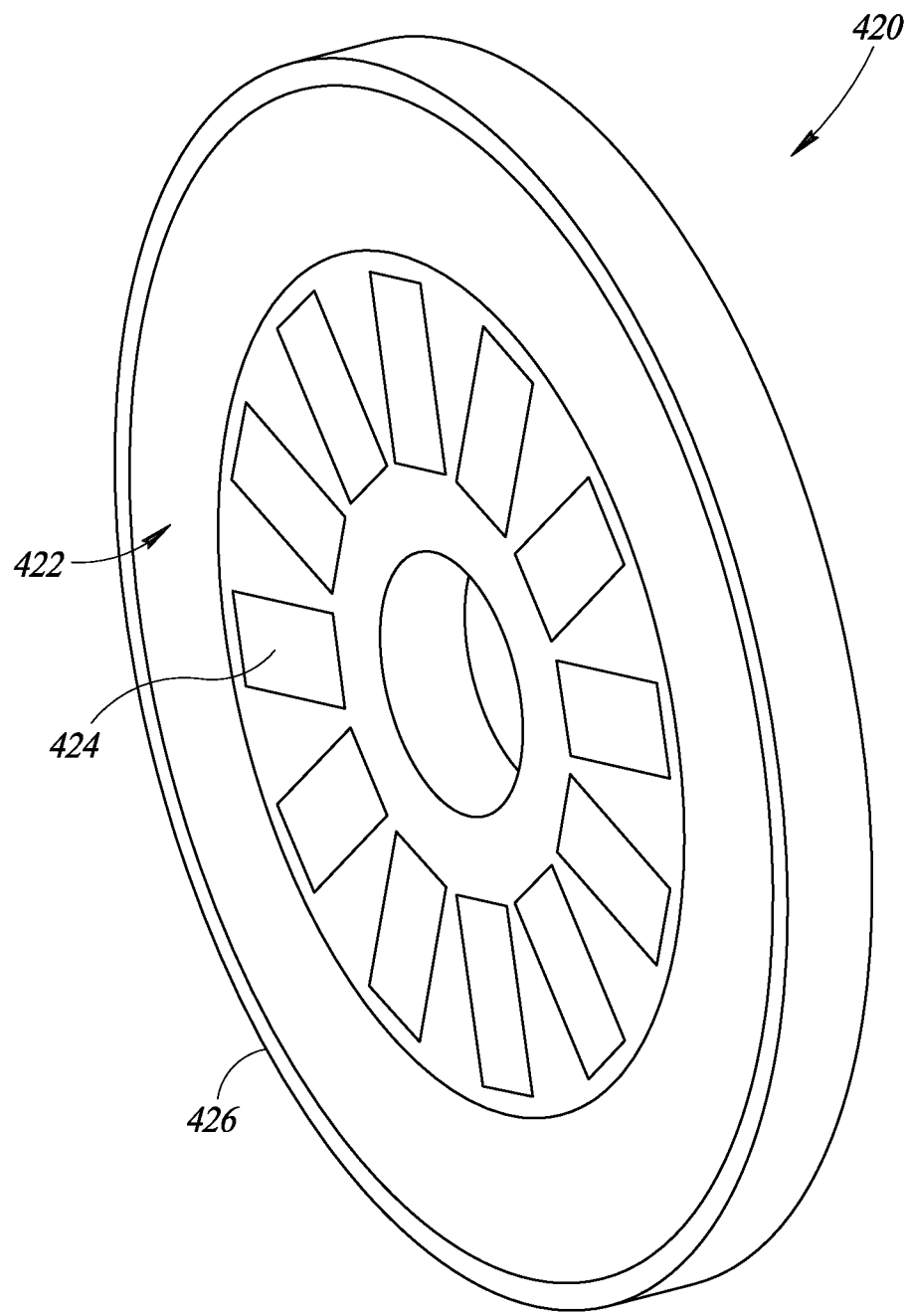
FIG. 6 is an isometric view of another one of the magnetic rotors of the two-rotor balanced magnetic rotor shown in FIG. 4, according to one or more embodiments disclosed herein.

FIGS. 4-6 depict a two-rotor balanced magnetic rotor assembly 400. Similar to the three-rotor balanced magnetic rotor assembly 200, the rotor assembly 400 includes a load rotor assembly 420 at a driver rotor assembly 410, and as described above, the load rotor assembly 420 is separated from the driver rotor assembly 410 by an air gap. The load rotor assembly 420 includes a single load rotor 422, but unlike the driver rotor assembly 110, the driver rotor assembly 410 of the two-rotor balanced magnetic rotor assembly 400 includes a single rotor 412. Each of the rotors 410, 420 include an array of magnets 414, 424. Similar to the array of magnets 122, 132, 172 in the rotor assembly 100, the magnets 414, 424 may be arranged in a circular or annular array of alternating polarities, for example as shown in FIG. 5. Also similar to the rotor assembly 100 described above, the arrays of magnets 414, 424 transmit rotational energy between the driver rotor 410 and the load rotor 420. The arrays of magnets 414, 424 and their magnetic fields also generate axial forces on the rotors 410, 420. In particular, when the rotors 410, 420 are rotating at the same rate, the polarity of the magnets 414 in the driver rotor 410 are attracted to corresponding magnets 424 in the load rotor 420. To counteract the attractive forces between the magnets 414 and 424, each of the rotors 410, 420 include a ring or annular shaped magnet 416, 426.

The polarity of the ring-shaped magnets 416 is chosen in order to counteract the attractive axial forces between the array of magnets 414, 424. For example, in the embodiment shown in FIGS. 4 and 5, the inward facing surface 416 of the ring magnet 412 has a polarity that matches the inward facing surface of the ring magnet in the rotor 420 such that the ring magnets repel each other with a force that counteracts the attractive forces between the array of magnets 414, 424.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A balanced magnetic rotor assembly comprising:
   a driver rotor assembly having a first driver rotor and a second driver rotor arranged about a rotational axis and being spaced apart from each other a distance along the rotational axis:
   the first driver rotor including a first array of a first plurality of magnets coupled to a first plate, the first array of the first plurality of magnets arranged in a first plane that is perpendicular to the rotational axis of the driver rotor assembly, a first of the first plurality of magnets having a north pole face in a first direction and being arranged between a second and a third of the first plurality of magnets, the second and the third of the first plurality of magnets having a south pole face also in the first direction;
   the second driver rotor including a second array of a second plurality of magnets coupled to a second plate, the second array of the second plurality of magnets arranged in a second plane that is perpendicular to the rotational axis of the driver rotor assembly and parallel to the first plane, a first of the second plurality of magnets having a south pole face in a second direction and being arranged between a second and a third of the second plurality of magnets, the second and the third of the second plurality of magnets having a north pole face also in the second direction; and
   a load rotor being arranged about the rotational axis and arranged between the first driver rotor and the second driver rotor, the load rotor being spaced apart from the first driver rotor by a first air gap and the second driver rotor by a second air gap, the first and the second air gaps providing contactless connections between the first driver rotor, the second driver rotor and the load rotor, the load rotor including a body having a third array of a third plurality of magnets therein, the third array of the third plurality of magnets arranged in a third plane that is perpendicular to the rotational axis of the driver rotor assembly and parallel to the first and second planes, a first of the third plurality of magnets having a north pole face in the first direction and a south pole face in the second direction and being arranged between a second and a third of the third plurality of magnets, the second and the third of the third plurality of magnets each having a south pole face in the first direction and a north pole face in the second direction.

2. A balanced magnetic rotor assembly comprising:

a driver rotor having a first body and a first array of a first plurality of magnets and a first ring magnet therein, the first array of the first plurality of magnets arranged in a first plane that is perpendicular to a rotational axis of the driver rotor, a first of the first plurality of magnets having a north pole face in a first direction and being arranged between a second and a third of the first plurality of magnets, the second and the third of the first plurality of magnets having a south pole face also in the first direction, the first ring magnet having a ring shape, the ring shape having a center that is on the rotational axis, the first ring magnet having a first magnetic pole having a first magnetic polarity in the first direction; and a load rotor assembly having a second body and a second array of a second plurality of magnets and a second ring magnet therein, the second array of the second plurality of magnets arranged in a second plane that is perpendicular to the rotational axis of the driver rotor, a first of the second plurality of magnets having a south pole face in a second direction, opposite the first direction and being arranged between a second and a third of the second plurality of magnets, the second and the third of the second plurality of magnets having a north pole face also in the second direction, the second ring magnet having a ring shape, the ring shape having a center that is on the rotational axis; the second ring magnet having a first magnetic pole having the first magnetic polarity in the second direction, the second body of the load rotor assembly being spaced apart from the first body of the driver rotor by an air gap, the air gap providing a contactless connection between the load rotor assembly and the driver rotor.

\* \* \* \* \*